June 24, 1930.  D. G. MACKENZIE  1,765,986

REAR AXLE STRUCTURE AND DRIVING MECHANISM

Filed Feb. 12, 1926  2 Sheets-Sheet 1

INVENTOR
D. G. MacKenzie
BY E. J. Fetherstonhaugh
ATTORNEY.

June 24, 1930.  D. G. MACKENZIE  1,765,986

REAR AXLE STRUCTURE AND DRIVING MECHANISM

Filed Feb. 12, 1926  2 Sheets-Sheet 2

INVENTOR
D. G. MacKenzie
BY: E. J. Fetherstonhaugh
ATTORNEY

Patented June 24, 1930

1,765,986

UNITED STATES PATENT OFFICE

DONALD GORDON MACKENZIE, OF MONTREAL, QUEBEC, CANADA, ASSIGNOR TO DONMAC PRODUCTS CORPORATION, OF NEW YORK, N. Y., A CORPORATION OF DELAWARE

REAR AXLE STRUCTURE AND DRIVING MECHANISM

Application filed February 12, 1926. Serial No. 87,919.

The invention relates to rear axle structure, and driving mechanism, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to relieve the machinery in motor driven vehicles from the bad effects of jars and jolts incident to road travel and at the same time insure the greater comfort to the occupants of a passenger car and safety to both persons and goods in any power driven vehicle; to reduce the vibration in and increase the life of the driving motor; to improve the operation of the driving mechanism and to enjoy greater benefits from the power employed; to increase the area available for freight or passengers and give free access to the parts for inspection and repair; to avoid frame twisting resulting from the inequalities of the road or other surface and thereby save expense and delays incident to the accompanying strains; to furnish an assembly of parts readily replaceable and therefore lending the construction to reliable and economical "service" work; and generally to provide efficiency and durability in such devices.

In the drawings, Figure 1 is a plan view of the axle structure and driving mechanism.

Like numerals of reference indicate corresponding parts in the various figures.

Figure 4:
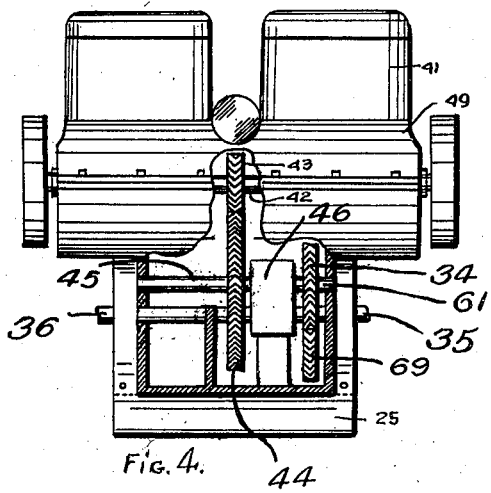
Figure 4 is a front elevation of the invention.
Figure 2:
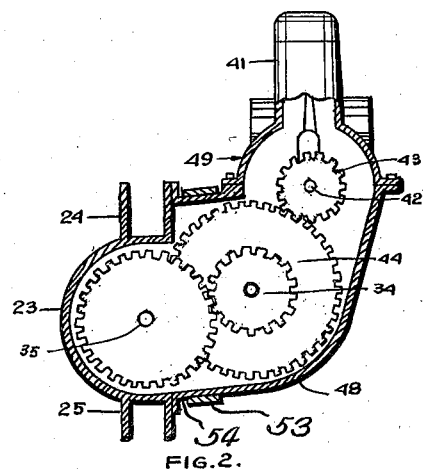
Figure 2 is a vertical sectional view of the ends of the casing showing the transmission members.
Figure 1:
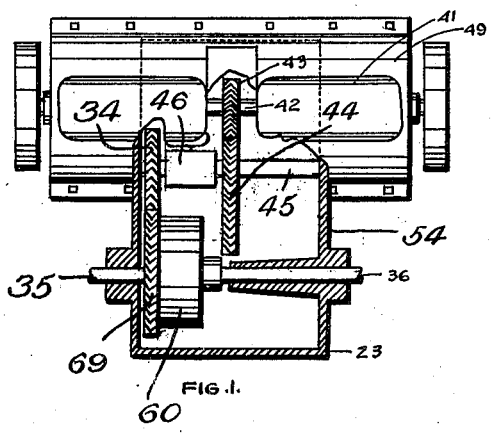
Figure 6:
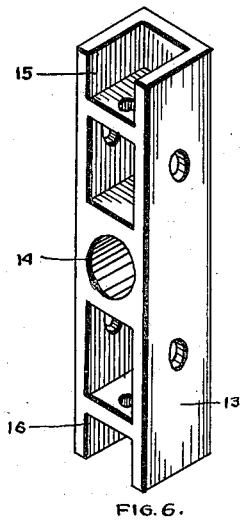
Figure 6 is an enlarged perspective detail of an end spacing post of the spring axles.
Figure 5:
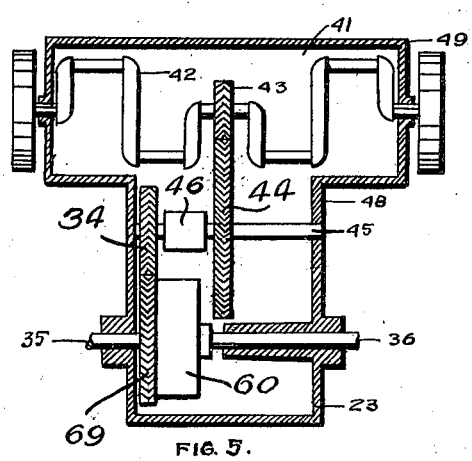
Figure 5 is a plan view of the driving mechanism.
Figure 3:
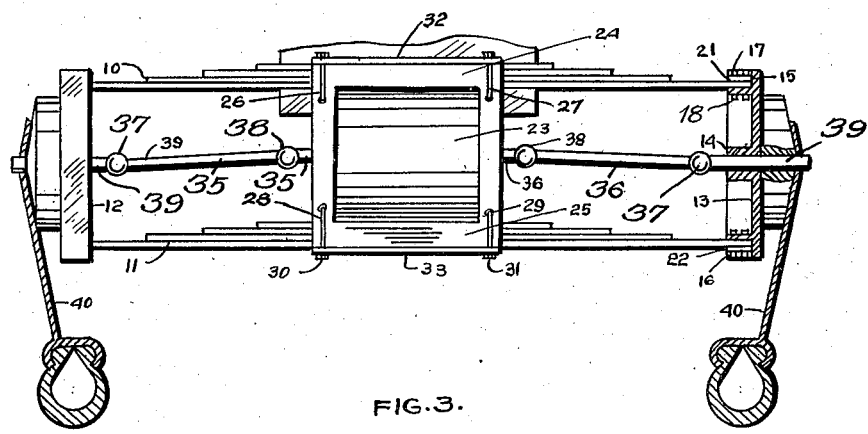
Figure 3 is a rear view of the axle structure, showing the transmission axle shafts.
Figure 8:
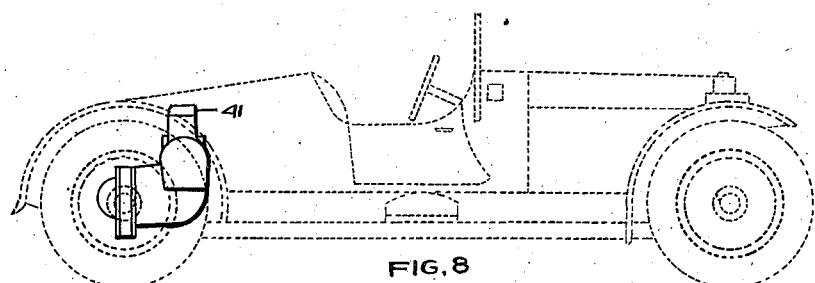
Figure 8 is an illustration showing a complete motor car in dotted lines with the engine equipment and transmission and solid lines over the dotted lines at the rear of the seat and in front and on the rear axle.
Figures 7, 9:
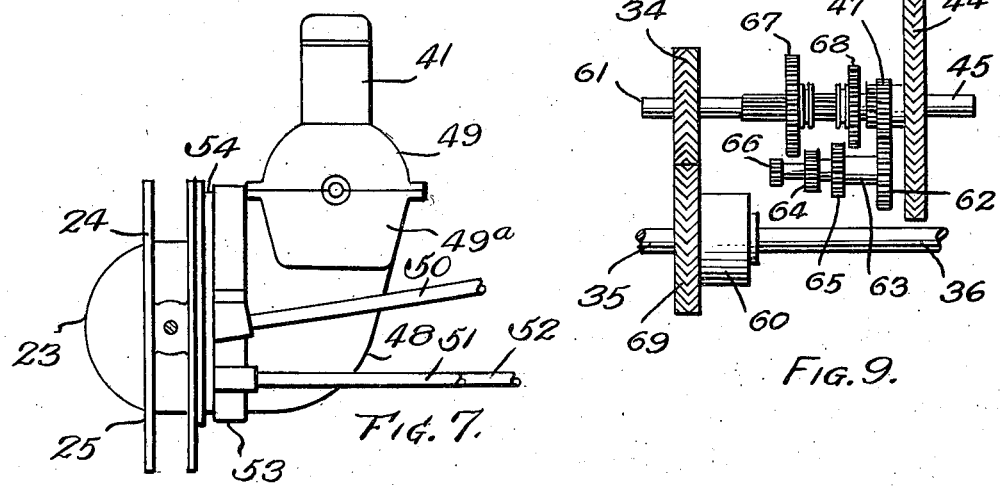
Figure 7 is an end elevation of the invention and a side elevation of the extension casing showing the frame on the bearing, surrounding the casing and the rods of the frame broken away.
Figure 9 is a plan view of the driving gears showing the train of gears from the engine shaft to the axle shafts.

Referring to the drawings, the numerals 10 and 11 indicate the parallel leaf springs of the axle structure these springs being spaced at the ends by the rigid posts 12 and 13, each of said posts being formed in box shape having an axle bearing 14 midway of the height thereof and recessed upper and lower ends 15 and 16 respectively for the ends of the springs 10 and 11 which are clamped in said recesses by the bolts 17 and nuts 18 or other fastenings through the loose clamping plates 21 and 22 and the beds of the recesses 15 and 16 respectively.

The end gear casing 23 is flanged at 24 and 25 to form the central spacing member for the axle springs 10 and 11, which are secured thereto by the U-shaped clamping straps 26, 27, 28, and 29 respectively and nuts 30 and 31, said straps extending through the flanges 24 and 25 and over the clamping plates 32 and 33.

The driving gear 34 drives the axle shafts 35 and 36 through the ring gear 69 and a gearing enclosed in the housing 60, which is generally termed in the construction of motor cars the differential gearing. The axle shafts extend outwardly through the casing 23 between the springs 10 and 11 to the axle bearings 14 each having a sliding joint and the universal joints 37 and 38 introduced intermediately of its length. The axles 39 of the wheels 40 are full floating axles being inserted in the bearings 14 and form connections with the axle shafts 35 and 36 thereby operatively connecting the driving gear mechanism to the wheels for the propulsion of the vehicle.

The engine 41 drives the crank shaft 42, upon which is the centrally mounted gear 43 preferably of either the V-toothed spur or of the silent self-adjusting chain type and this gear 43 drives the gear 44 on the shaft 45 of the gearset or change gears 46. The driving pinion 47 is mounted on the shaft 45 and drives the gear 34 mounted on the shaft 61 through the gear 62 mounted on the counter shaft 63 and the gear 64 or 65 or 66 on said counter shaft, these gears 64, 65, or 66 coacting with the shift gears 67 or 68, the gear 68 coacting directly with the gear 47 by selection. The gears 43, and 44, the shift gears and the driving gears aforesaid are encased in the extension 48 from the engine casing 49, while the differential housing 60 and ring gear 69 are enclosed in the casing 23 secured to the extension 49 through meeting flanges.

The engine 41 is transversely mounted and is integral with the casing 49 over the truss bar 50 and longitudinal bars 51 and 52 all of said bars or more if required terminating in the ring 53 journalled on the bearing 54 mounted on the extension 48. Therefore in the course of travel any inequalities of the road will be readily accounted for and the connections remain quite undisturbed.

It will be seen from the description of the details of construction that the power for driving is concentrated with the rear axle structure, so as to become to all intents and purposes a unitary member therewith, all the driving gears being gathered together within the casings that are common while the engine is one with the axle, and yet there is flexibility introduced between the axle structure and the frame to permit variation of the latter according to the nature of the ground.

The operation will be readily understood as the drive is direct from the crank shaft to the gearset shaft and from there to the differential and the wheels, consequently the lubrication is simplified and the transmission so shortened as to eliminate the dangers incidental to bringing the power from the front to the rear of the vehicle and yet a modern and efficient construction is provided that will reduce the power losses and increase the stability of the structure as well as materially improving the tractional properties of the vehicle.

This construction is particularly adaptable for the light and medium weight cars as the weight is evenly and advantageously distributed, though it may be applied to almost any type of car, no doubt with modifications in regard to the situation of the parts and their supports.

The driving mechanism in this invention is highly efficient in many features, but one in particular may be emphasized and that is the central position of the main driving gear on the engine shaft, thereby reducing the torque strain in evidence on both driving and driven shafts in the longitudinal shaft installation, and permitting the construction of a symmetrical motor having dual flywheels equidistant from the driving gear and neutralizing power impulses. The adoption of the transverse driving shaft equipment eliminates bevel gears and the side thrust due to their use and at the same time effects a through drive with spur gears of the V-tooth type, or silent chain, thereby economizing in power and lessening the vibration throughout the car.

It will be noticed that the ends of the spring axle members are rigidly secured in flanged extensions from the distancing end posts forming recesses, the spring ends being usually held thereon under a clamping plate bolted to the springs and post extension.

This construction removes the necessity of shackles as the springs are permanently and securely held and thus a great trouble is removed and all rattling from shackle/fastening and danger from broken shackles eliminated.

The full floating axle arrangement and the clamp form of spring fasteners substituted for shackles lends itself to a wheel mounting hitherto not practical, as in this invention the wheels are offset inwardly below the axle to bring the tread under the clamp fasteners. This materially increases the strength of the spring structure, as well as tending to contract the area of the driving parts.

What I claim is:—

1. In vehicle driving mechanism a vehicle frame, a differential and transmission casing forming a frame bearing for the rear end of said vehicle frame, an axle structure resiliently supporting said casing centrally, axle shafts from said casing, an engine operating a crank shaft and gear centrally mounted thereon and communicating with said differential casing and wheels driven by said axle shafts.

2. In vehicle driving mechanism, an engine operating a crank shaft and driving gear between cranks, a transmission shaft and gear thereon driven by the aforesaid gear, a differential gearing driven by said transmission gear, axle shafts operatively connected with said differential gearing, a casing common to said engine, differential gearing and communicating gears and forming a frame bearing, a frame oscillatable on said bearing, and wheels rotated by said axle shafts.

3. In a power driven vehicle, a rear axle structure, an engine having its shaft transverse to the vehicle and a gear mounted on said shaft centrally within the engine, transmission gears including a gear set operatively connected to the rear wheels a vehicle frame and a common casing for said engine and gearing supported by and forming a bearing for the oscillation of said frame.

4. In a power driven vehicle, a resilient rear axle structure supporting casings, a driving mechanism including driving and driven gears in said casings, an engine operating a transverse shaft between cylinders and driving from the centre of the engine shaft and a vehicle frame oscillatable and supported from said casings.

5. In vehicle construction, a frame support formed of a casing having a frame bearing and a transmission extension, an engine rigid with said casing, a frame adapted to carry the body of the vehicle and formed at its rear end to bear on said frame bearing and rotatable thereon and a rear axle structure having spring members supporting said casing and rigid therewith.

Signed at Montreal, Canada, this 16th day of November, 1925.

DONALD GORDON MACKENZIE.